(12) United States Patent
Goodwin

(10) Patent No.: US 6,224,172 B1
(45) Date of Patent: May 1, 2001

(54) TENSIONING DEVICE FOR A TRACKED VEHICLE

(75) Inventor: Jon Goodwin, Cedarapids, IA (US)

(73) Assignee: Cedarapids, Cedar Rapids, IA (US)

( * ) Notice: Subject to any disclaimer, the term of this patent is extended or adjusted under 35 U.S.C. 154(b) by 0 days.

(21) Appl. No.: 09/045,296

(22) Filed: Mar. 20, 1998

(51) Int. Cl.[7] ................. B62D 55/14; F16J 1/10
(52) U.S. Cl. .......................... 305/145; 305/143
(58) Field of Search .................. 305/10, 16, 34, 305/125, 143, 144, 145 I; 180/9.1, 9.52

(56) References Cited

U.S. PATENT DOCUMENTS

| | | | | |
|---|---|---|---|---|
| 3,310,127 | * | 3/1967 | Erwin-Walter Siber et al. ... | 305/144 |
| 3,910,649 | * | 10/1975 | Röskaft ................. | 305/144 |
| 3,972,569 | * | 8/1976 | Bricknell ............... | 305/125 |
| 4,227,748 | * | 10/1980 | Meisel ................. | 305/10 |
| 5,167,291 | * | 12/1992 | Mann ................... | 180/6.3 |
| 5,316,381 | * | 5/1994 | Isaacson et al. ........ | 305/10 X |
| 5,334,106 | * | 8/1994 | Purcell ................ | 305/10 X |
| 5,368,115 | * | 11/1994 | Crabb .................. | 305/21 X |
| 5,482,126 | * | 1/1996 | Bouit et al. ........... | 305/10 X |
| 5,927,412 | * | 7/1999 | Crabb .................. | 305/116 X |
| 5,984,436 | * | 11/1999 | Hall ................... | 305/143 |
| 5,988,775 | * | 11/1999 | Nordberg ............... | 305/143 |
| 6,024,183 | * | 2/2000 | Dietz et al. ........... | 305/144 |
| 6,106,082 | * | 8/2000 | Gustin ................. | 305/145 |

* cited by examiner

*Primary Examiner*—S. Joseph Morano
*Assistant Examiner*—Jason P. Bellinger
(74) *Attorney, Agent, or Firm*—Marshall, O'Toole, Gerstein, Murray & Borun

(57) ABSTRACT

A tensioning device for maintaining proper belt tension on the drive belt of a tracked vehicle. The flexible drive belt extends between a drive wheel and a carriage mounted free wheel. An idler device dynamically adjusts the tension on the drive belt, and includes a drive wheel mounted to a frame, a carriage slidably mounted to the frame and supporting a free wheel, a hydraulic cylinder mounted to the frame and engaging the carriage for applying a force to the carriage. A hydraulic control circuit operates the hydraulic cylinder, the control circuit being adapted to adjust the pressure in the hydraulic cylinder to apply a first force against the carriage in response to a first detected condition, such as during normal forward operation of the vehicle. The control circuit is further adapted to apply a second force against the carriage in response to a second detected condition, such as during reverse operation of the vehicle. A sensor is provided for detecting the operating condition of the vehicle and is connected to the hydraulic circuit.

20 Claims, 5 Drawing Sheets

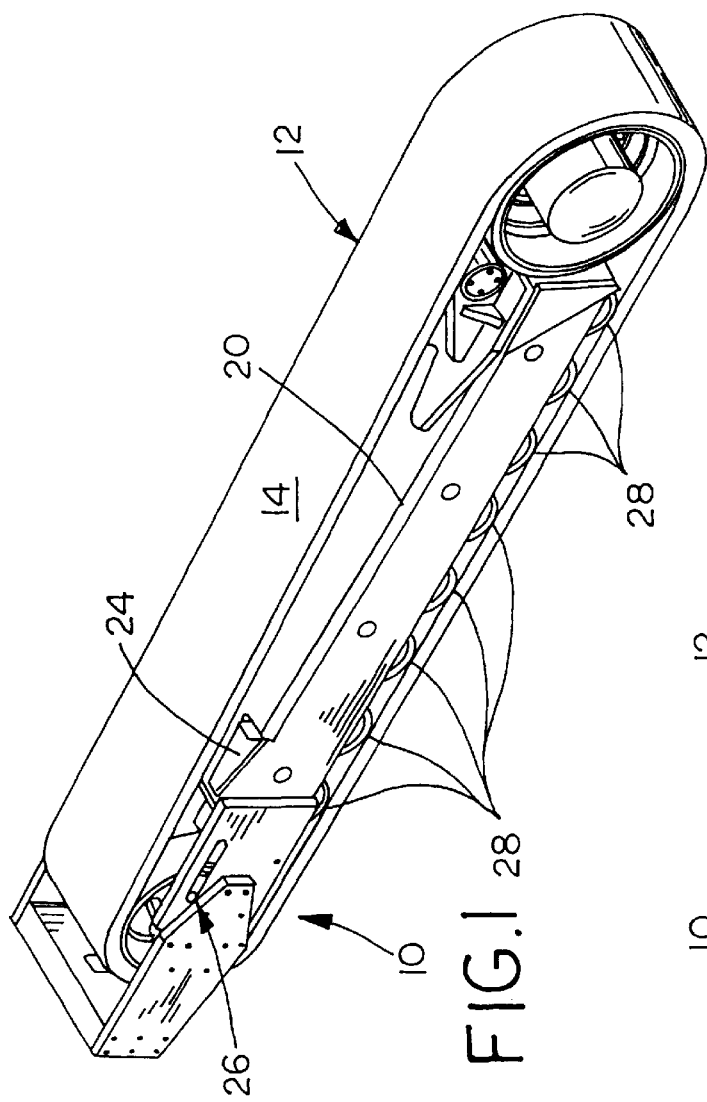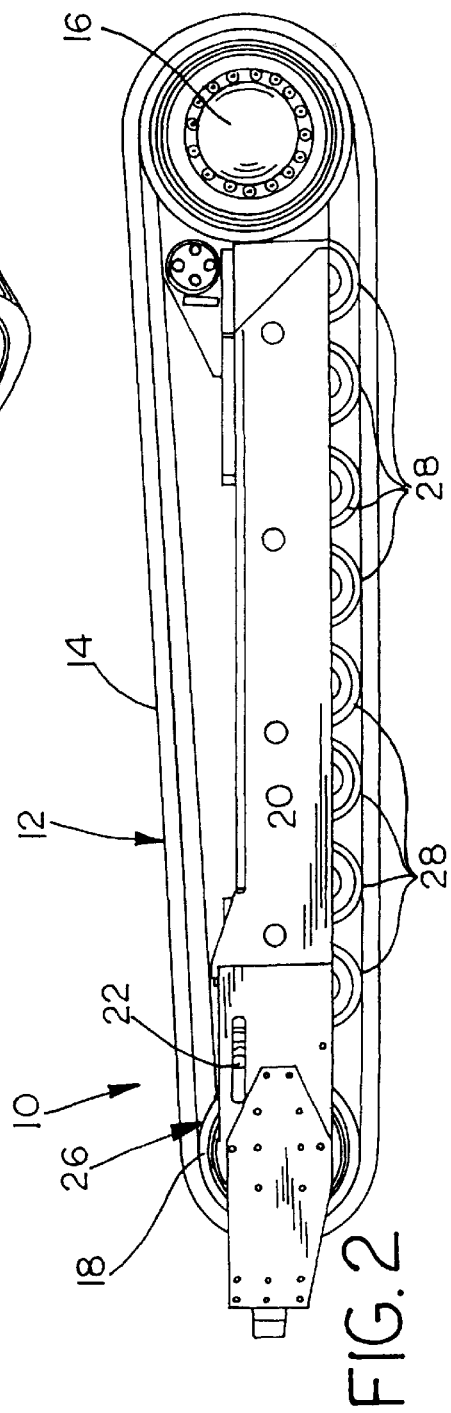

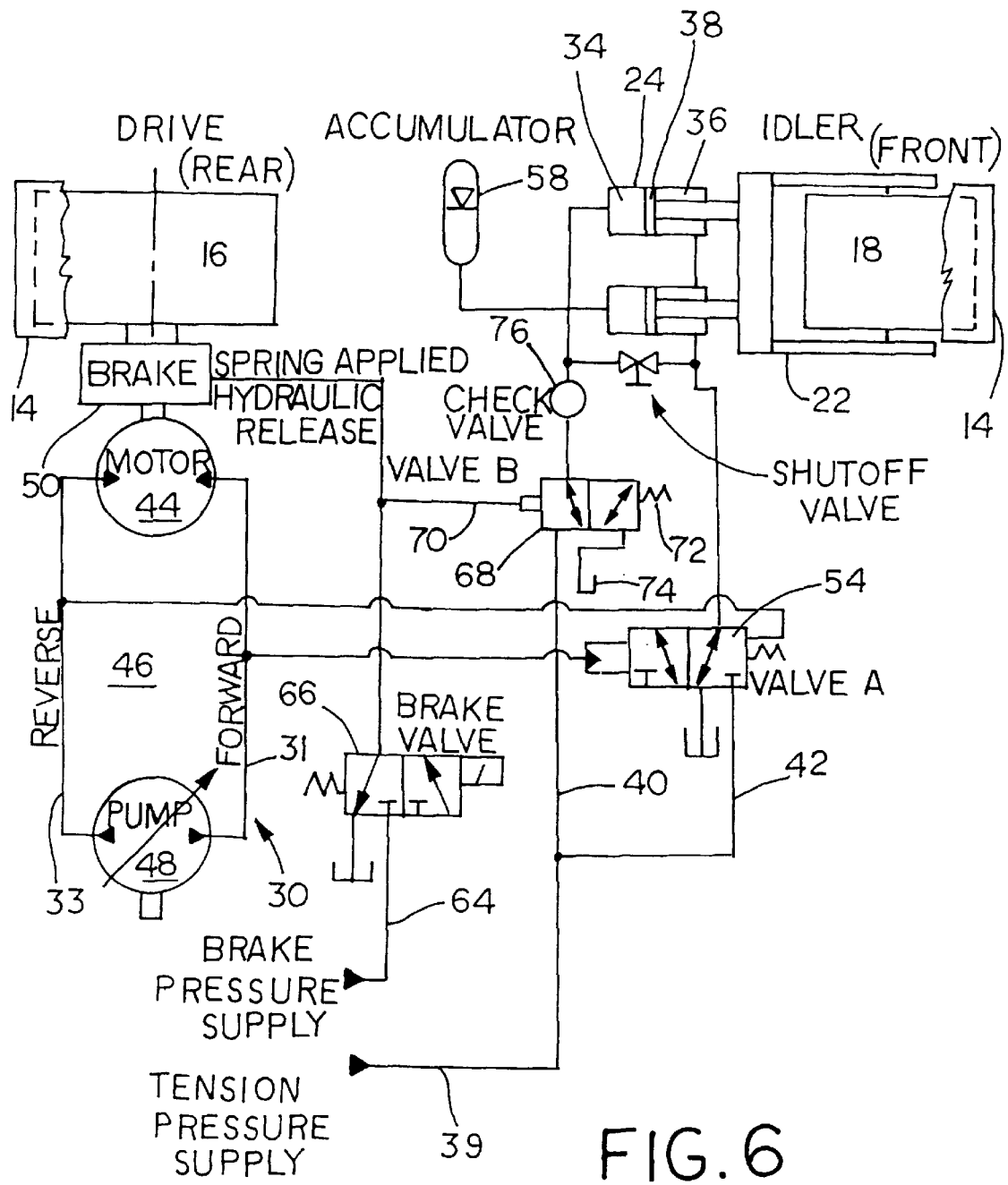

TENSIONING DEVICE FOR A TRACKED VEHICLE

FIELD OF THE INVENTION

The present invention relates to a tensioning device for maintaining the proper tension on the track of a flexible belt driven vehicle.

BACKGROUND OF THE INVENTION

Flexible tracked vehicles are generally well known in the art, and are well-suited for many applications in which more conventional wheeled vehicles are unsatisfactory. For example, conventional wheeled vehicles traditionally do not have enough traction to operate in and around most construction sites, and thus a tracked vehicle, which spreads its load over a much greater area, is much more capable of traversing the rough and often muddy terrain at such construction sites. Bulldozers and certain types of paving machines are two examples of commonly used flexible tracked vehicles.

Most heavy tracked vehicles, such as bulldozers, use a flexible metal belt made go of a plurality of connected links, and are driven by a positive drive system in which a drive wheel engages teeth or cogs on the inside of the metal belt. On the other hand, many lighter duty flexible tracked vehicles use a flexible continuous rubber track incorporating a friction drive system. In contrast to a positive drive system, a friction drive system relies on the friction between the drive wheel and the track or belt in order to transmit motive force to the belt and hence the ground. The flexible track extends between a drive wheel and a free wheel, and an idler assembly is used to apply pressure to the free wheel in order to maintain the proper tension on the drive belt. The free wheel is slidably or adjustably mounted in a carriage assembly, and a compression spring or a gas charged cylinder applies outward force to the carriage assembly, thereby applying tension to the belt.

On friction drive systems, proper belt tension is critical to the operation of the vehicle. Unfortunately, when the drive system of the vehicle is reversed, the force applied against the free wheel, and hence the idler assembly, increases significantly. In such a state, a much greater force is required in order to maintain the proper belt tension. If not enough force is applied to the idler assembly and the belt tension decreases significantly, the carriage assembly and the free wheel will be drawn toward the drive wheel, and the belt will begin to bunch and/or slip. In some instances, the belt may even become untracked.

Consequently, the typical approach is to maintain a high level of force against the carriage assembly at all times. Unfortunately, this approach significantly increases the load on the drive components of the vehicle during normal forward operation. Many system components are thus subjected to increased wear and tear, which leads to premature system failure. Accordingly, there exists a need for an improved tensioning device or idler assembly that will automatically adjust to different operating conditions in order to prolong the life of the drive system and its components.

SUMMARY OF THE INVENTION

The present invention uses a two sided hydraulic cylinder connected to a control circuit to control the amount of force exerted by the hydraulic cylinder against a carriage supporting the free wheel of the tracked vehicle. During normal forward operating conditions, when the required force on the carriage is low, both sides of the hydraulic cylinder are charged and the cylinder exerts a constant force against the carriage. When the vehicle is shifted to reverse, the required force against the carriage increases significantly. Accordingly, a valve drains the second side of the hydraulic cylinder, while the force exerted against the first side of the cylinder remains essentially constant. Thus, the force against the carriage increases to the required level. An accumulator helps to maintain adequate pressure on the first side of the hydraulic cylinder.

According to one aspect of the invention, a tensioning device for dynamically adjusting the belt tension on a tracked vehicle includes a drive wheel mounted to a frame, a carriage slidably mounted to the frame and supporting a free wheel, a hydraulic cylinder mounted to the frame and engaging the carriage for applying a force to the carriage, a hydraulic circuit operatively connected to the hydraulic cylinder, and a sensor, a detector, or other similar devices for detecting the operating condition of the vehicle. The control circuit is adapted to adjust the pressure in the hydraulic cylinder to apply a first force against the carriage in response to a first detected condition, such as a forward drive condition, and is further adapted to apply a second, greater force against the carriage in response to a second detected condition, such as reverse, in order to maintain proper belt tension. A sensor is provided for detecting the operating condition of the vehicle and is operatively connected to the hydraulic circuit.

Preferably, the hydraulic cylinder is a two sided double acting cylinder, and an accumulator maintains a constant pressure against a first side of the hydraulic cylinder. The hydraulic circuit includes a valve operatively connected to a second side of the hydraulic cylinder, and the valve is shiftable between a pressurizing position for charging the second side in response to the first detected condition, such as a forward condition, and a drain position draining the second side in response to the second detected condition, such as reverse. Accordingly, during normal forward operation of the vehicle, the forces on the two sides of the cylinder are essentially balanced. When the vehicle is shifted to reverse, the force on the second side of the cylinder is dropped significantly by virtue of the valve shifting to a drain position, while the accumulator maintains a constant force on the first side of the cylinder. Accordingly, a greater force is applied against the carriage and additional belt tension is applied to counteract the increased tension demands of the reverse condition. A check valve is provided for maintaining the pressure in the accumulator and hence the force against the carriage, at a predetermined level.

According to another aspect of the invention, an idler device for a tracked vehicle having a flexible drive belt includes a drive wheel mounted to a frame, a carriage slidably mounted to the frame and supporting a free wheel, and a hydraulic cylinder mounted to the frame and engaging the carriage for applying a force to the carriage. A hydraulic control circuit controls the operation of the hydraulic cylinder. The control circuit includes a sensor, and is adapted to adjust the pressure in the hydraulic cylinder to thereby apply a first force against the carriage in response to the detection of a first condition, and further to apply a second force against the carriage in response to the detection of a second condition.

According to yet another aspect of the invention, a tensioning device for adjusting the tension on the drive belt of a tracked vehicle having a frame, a drive wheel mounted to the frame, and a free wheel mounted to a carriage and slidably supported on the frame, includes a sensor for detecting the operating condition of the vehicle and an idler assembly mounted to the frame. The idler assembly is positioned to apply a force to the carriage. A controller, such as a control valve, serves to control the force applied by the idler assembly against the carriage, whereby a first force is applied against the carriage in response to the detection of a first condition and a second, greater force is applied against the carriage in response to the detection of the second condition.

Further objects, features and advantages of the present invention will become readily apparent to those skilled in the art upon a reading of the following description and the appended claims.

BRIEF DESCRIPTION OF THE DRAWINGS

FIG. 1 is an elevational view of a track unit for use on a conventional flexible tracked vehicle;

FIG. 2 is a respective view of the track unit shown in FIG. 1;

FIG. 6 is a schematic view of the control circuit shown in FIGS. 4 and 5 but illustrating the state of the control circuit when the vehicle is operating in the reverse drive direction.

DETAILED DESCRIPTION OF THE INVENTION

The following detailed description is not intended to limit the scope of the invention to the precise form disclosed. Instead, the embodiment illustrated herein has been chosen and described in order to best explain the principles of the invention so that others skilled in the art may follow its teachings.

Figure 3:
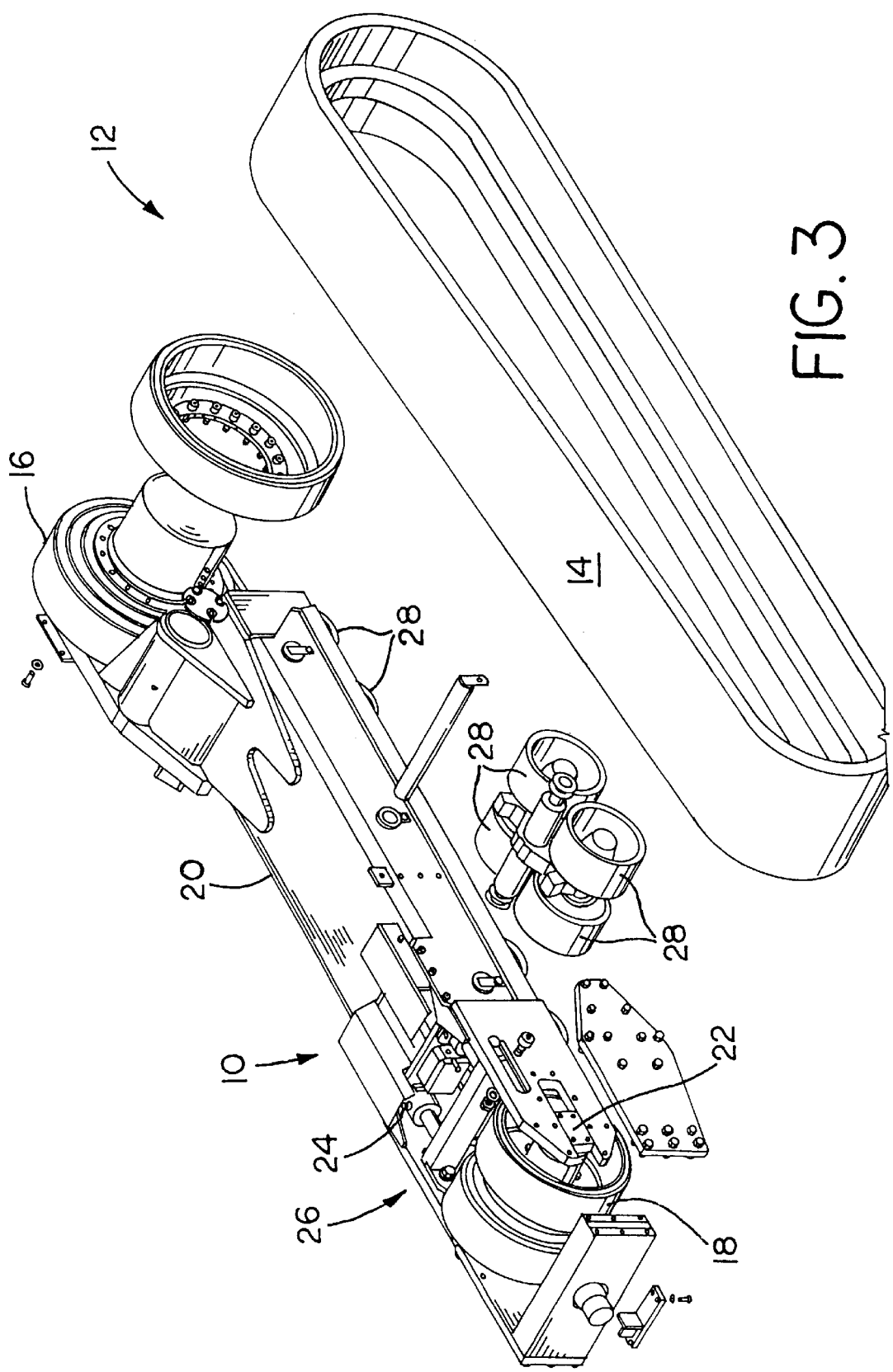
FIG. 3 is an enlarged exploded view in perspective of the track unit illustrated in FIGS. 1 and 2 showing the various components thereof including the idler assembly for applying tension to the flexible track or belt.

Referring now to FIGS. 1–3 of the drawings, an idler device 10 is shown attached to the track unit 12 of the type commonly employed on a tracked vehicle (not shown). The track unit 12 includes a conventional flexible drive belt 14 which extends between a rear drive wheel 16 and a front free wheel 18 rotatably mounted to a frame 20. The track unit 12 includes a carriage assembly 22 which supports the free wheel 18 and which is slidably mounted to the frame 20 in a well known manner, so that movement of the carriage assembly 22 relative to the frame 20 alters the tension in the drive belt 14 as is well known to those skilled in the art. The track unit 12 shown is of the friction drive variety, in which motive force is transmitted to the drive belt 14 by virtue of the frictional force between the drive belt 14 and the wheels 16, 18, which friction is imparted to the wheels 16, 18 by the tension in the drive belt 14. One or more hydraulic cylinders 24 are mounted to the frame 20 and are connected to the carriage assembly 22 in order to alter the position of the carriage assembly 22 relative to the frame. An idler assembly 26, in the embodiment shown, is comprised of the free wheel 18, the carriage assembly 22, and the hydraulic cylinder 24. Alternatively, other forms for the idler assembly may be employed. As shown in FIG. 3, the track unit 12 also includes a variety of other components well known to those skilled in the art, such as a plurality of idler wheels 28 and a hydraulic drive system 30 (shown schematically in FIGS. 4–6, which hydraulic drive system 30 includes a forward drive circuit 31 and a reverse drive circuit 33, both of which are shown schematically in FIGS. 4–6).

Figure 4:
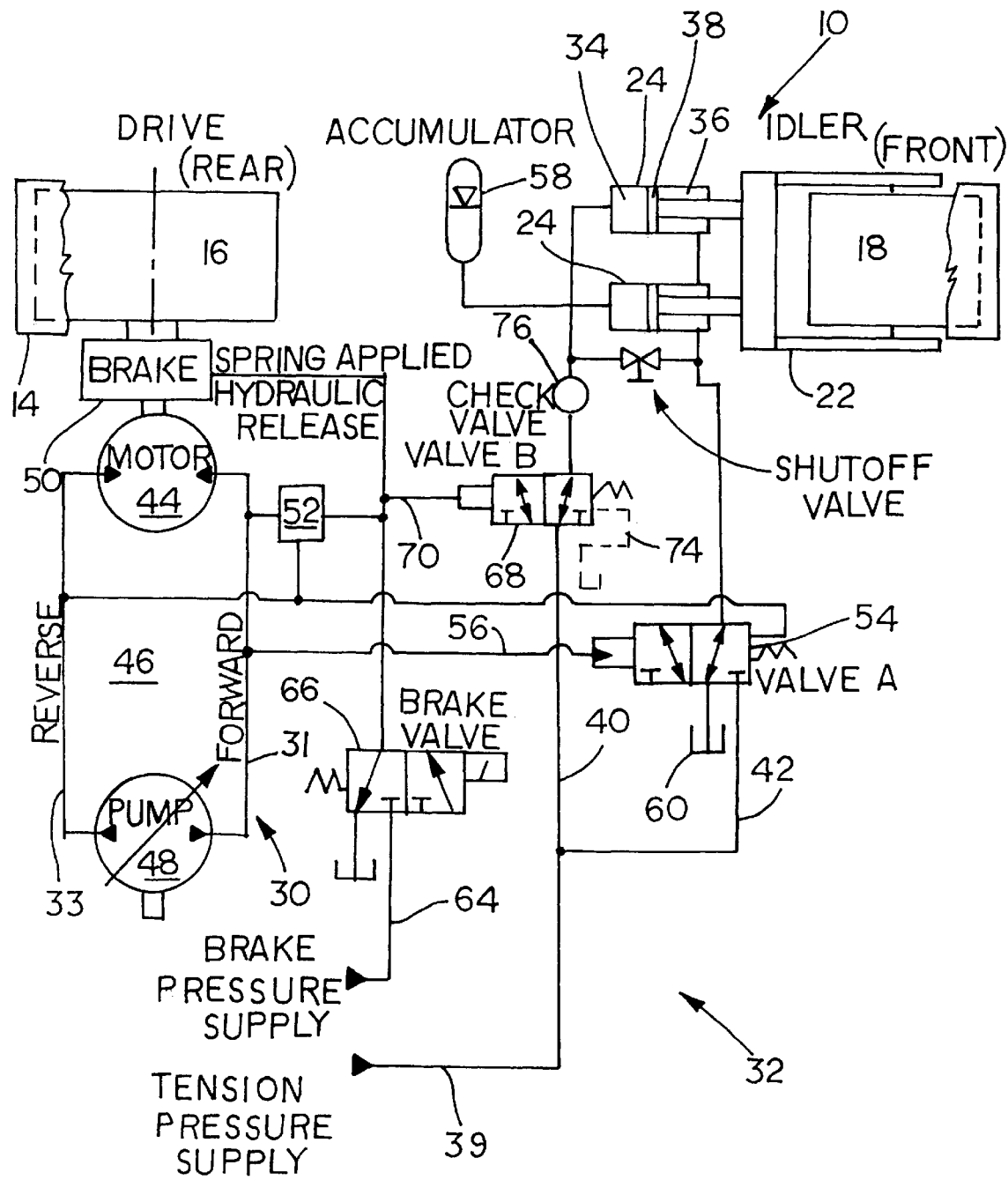
FIG. 4 is a schematic view of a hydraulic control circuit for use with the track unit of FIGS. 1–3 and illustrating the state of the control circuit when the vehicle is off and the brake applied.
Figure 5:
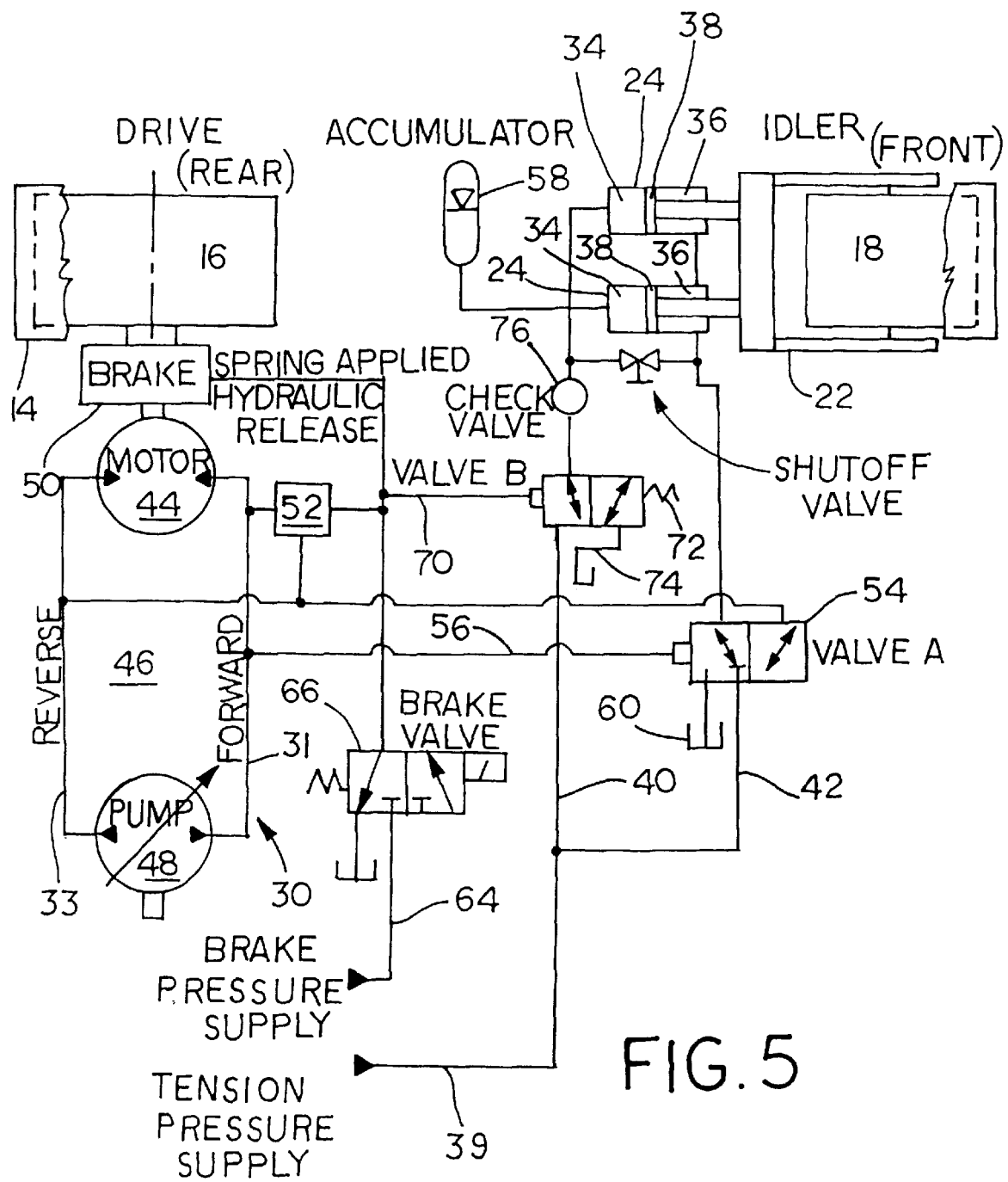
FIG. 5 is a schematic view of the control circuit shown in FIG. 4 but illustrating the stat the control circuit when the vehicle is operating in the forward drive direction.

Referring now to FIGS. 4 through 6, a hydraulic control circuit incorporating the features of the present invention is shown schematically and is generally referred to by the reference numeral 32. As can be seen schematically, the hydraulic cylinders 24 are two sided, having a first chamber or side 34 and a second chamber or side 36 separated by a central piston 38. As is well known to those skilled in the art, the force exerted on the central piston 38 is a function of the pressure in both sides 34, 36, which is calculated using well known engineering principles. The cylinder 24 is positioned to apply a force against the carriage assembly 22. By controlling the pressure in both sides 34, 36 of the hydraulic cylinder 24, the force exerted on the carriage assembly, and hence the drive belt 14, can be adjusted. Although two cylinders 24 are shown, for the sake of convenience only the function and operation of a single cylinder 24 will be described in detail. Control circuit 32 includes a supply line 39 having a pair of feed lines 40, 42, in flow communication with the first and second sides 34, 36, respectively, of the hydraulic cylinder 24.

The drive system 30 includes a motor 44, a transmission 46, a hydraulic pump 48, and a brake system 50, which are illustrated schematically, and which are connected to the hydraulic circuit 32 by a sensor circuit 52. The sensor circuit detects the present operating condition of the brake system 50 and the components of the drive system 30, including the transmission 46, and adjusts the hydraulic cylinder 24 as will be further explained below.

The control circuit 32 includes a valve 54 in supply line 42. Valve 54 includes a spring for biasing the valve 54 towards the position of FIG. 4 when the vehicle is not operating. When the transmission 46 is shifted to forward, a control line 56 shifts the valve 54 to the position of FIG. 5, which charges the second side 36 of the hydraulic cylinder 24. An accumulator 58 is connected to the first side 34 of the cylinder 24, and maintains a generally constant pressure level within the first side 34. The second side 36 is charged by the shifting of the valve 54, and a force is exerted against the carriage assembly, which force is a function of the difference between the forces exerted on the piston 38 by the two sides 34, 36 of the hydraulic cylinder 24. The resulting force to the right of FIGS. 4-6 is sufficient to maintain the proper tension on the drive belt 14. When the transmission 46 is shifted to reverse, the valve 54 shifts to the position of FIG. 4, and the pressure in the second side 36 of the hydraulic cylinder 24 is lessened or released via a drain 60.

The brake system includes a supply line 64 connected to a brake valve 66. A valve 68 is provided in supply line 40 and is connected to the brake system 50 by a control circuit 70. Valve 68 includes a return spring 72 and a drain 74. When in the position of FIG. 4, valve 68 charges the accumulator 58. A check valve 76 maintains constant pressure in the accumulator 58. When the brake is applied, the valve 68 shifts to a drain position of FIG. 5, because no charging of the accumulator is required in such a condition. The brake valve 66 operates in conjunction with the brake system 50 in a conventional manner as is well known to those skilled in the art.

In operation, when the brake system 50 is applied and the vehicle is not moving, valves 54 and 68 are positioned as shown in FIG. 4. When the transmission 46 is shifted to forward, valve 54 shifts to the position of FIG. 5, so that both sides 34, 36 of the hydraulic cylinder are charged via lines 40 and 42. Check valve 76 governs the pressure in the accumulator 58 and hence the first side 34 of the cylinder 24. The force applied against the carriage assembly 22 can then be controlled at a desired level by incorporating conventional engineering principles and well known pressure control methods. When the vehicle transmission 46 is shifted to reverse, valve 54 shifts to the drain position, and fluid within the second side 36 is routed to the drain 60. The pressure within the first side 34 is maintained as a constant by virtue of the accumulator 58, and as a result additional force is applied against the carriage assembly 22. Consequently, additional tension force is applied to the drive belt 14.

It will be understood that the above description does not limit the invention to the precise form disclosed. It is contemplated that various modifications and substitutions can be made without departing from the scope of the following claims.

What is claimed:

1. On a tracked vehicle having a flexible drive belt extending between a drive wheel and a carriage mounted free wheel, an idler device for dynamically adjusting the tension on the drive belt, comprising:
   a drive wheel mounted to a frame, the drive wheel being operatively connected to a hydraulic drive system, the hydraulic drive system including a forward drive circuit and a reverse drive circuit;
   a carriage slidably mounted to the frame and supporting a free wheel;
   a hydraulic cylinder mounted to the frame and engaging the carriage for applying a force to the carriage; and
   a hydraulic control circuit operatively connected to the hydraulic cylinder, the hydraulic control circuit including a pressure sensor adapted to detect a pressure condition in each of the forward and reverse drive circuits of the hydraulic drive system, the hydraulic control circuit further being adapted to adjust the pressure in the hydraulic cylinder to thereby apply a first force against the carriage in response to a first detected pressure condition and further to apply a second force against the carriage in response to a second detected pressure condition, the first detected pressure condition corresponding to activation of the forward drive circuit and the second detected pressure condition corresponding to activation of the reverse drive circuit and wherein the second force is greater than the first force.

2. The device of claim 1, wherein the vehicle includes a hydraulic brake system shiftable between an applied operating condition and a released operating condition, the pressure sensor further being operatively connected to the hydraulic brake system.

3. The device of claim 1, wherein the hydraulic cylinder is a two sided cylinder, and wherein the hydraulic circuit includes an accumulator for maintaining a constant pressure against a first side of the hydraulic cylinder.

4. The device of claim 3, wherein the hydraulic circuit includes a valve operatively connected to a second side of the hydraulic cylinder, the valve being shiftable between a cylinder second side pressurizing position in response to detection of the first pressure condition and a cylinder second side drain position in response to detection of the second pressure condition.

5. The device of claim 3, wherein the accumulator includes a check valve for maintaining the force in the cylinder at a predetermined level, thereby maintaining the force against the carriage at a predetermined level.

6. The device of claim 1, wherein the hydraulic cylinder is two sided, and wherein the hydraulic circuit includes an accumulator for maintaining a substantially constant force against a first side of the hydraulic cylinder, and including a valve connected to a second side of the hydraulic cylinder, the valve being shiftable between a cylinder second side pressurizing position in response to the detection of the first pressure condition and a cylinder second side drain position in response to the detection of the second pressure condition.

7. The device of claim 3, wherein the hydraulic circuit includes a charging valve connected to the accumulator and shiftable between an open position and an accumulator charging position.

8. On a tracked vehicle having a flexible drive belt extending between a drive wheel and a carriage mounted free wheel, an idler device for dynamically adjusting the tension on the drive belt, comprising:
   a drive wheel mounted to a frame, the drive wheel being operatively connected to a hydraulic drive system having a forward drive circuit and a reverse drive circuit;
   a carriage slidably mounted to the frame and supporting a free wheel;
   a hydraulic cylinder mounted to the frame and engaging the carriage for applying a force to the carriage; and
   a hydraulic control circuit operatively connected to the hydraulic cylinder and the hydraulic drive system, the control circuit including a sensor adapted to detect the pressure in each of the forward and reverse drive circuits, the control circuit being adapted to adjust the pressure in the hydraulic cylinder to thereby apply a first force against the carriage in response to a first detected condition corresponding to pressurization of the forward drive circuit and further to apply a second and greater force against the carriage in response to a second detected condition corresponding to pressurization of the reverse drive circuit.

9. The device of claim 8, wherein the vehicle includes a brake system shiftable between an applied and a released condition, and wherein the sensor is operatively connected to the brake system.

10. The device of claim 8, wherein the hydraulic cylinder is a two sided cylinder, and wherein the hydraulic control circuit includes an accumulator for maintaining a constant pressure against a first side of the hydraulic cylinder.

11. The device of claim 10, wherein the hydraulic cylinder includes a valve operatively connected to a second side of the hydraulic cylinder, the valve being shiftable between a cylinder second side pressurizing position in response to the detection of the first condition and a cylinder second side drain position in response to detection the second condition.

12. The device of claim 11, wherein file accumulator includes a check valve for maintaining the force in the cylinder first side at a predetermined level, thereby maintaining the force against +he carriage at a predetermined level.

13. The device of claim 8, wherein the hydraulic cylinder is two sided, and including an accumulator operatively connected to the hydraulic cylinder first side for maintaining a substantially constant force against a first side of the hydraulic cylinder, and a valve connected to a second side of the hydraulic cylinder, the valve being shiftable between a cylinder second side pressurizing position in response to the detection of the first condition and a cylinder second side drain position in response to the detection of the second condition, whereby the force against the carriage is greater is response to the detection of the second condition.

14. The device of claim 10, wherein the hydraulic control circuit includes a charging valve connected to the accumulator and shiftable between an open position and an accumulator charging position.

15. A device for dynamically adjusting the tension on the drive belt of a tracked vehicle, comprising:

a drive wheel mounted to a frame, the drive wheel being driven by a hydraulic drive system having a forward drive circuit and a reverse drive circuit, the hydraulic drive system further having means for selectively pressurizing the forward drive circuit and the reverse drive circuit;

a carriage slidably mounted to the frame and supporting a free wheel;

adjustable tensioning means mounted to the frame and engaging the carriage for applying a force to the carriage, the tensioning means including control means for controlling the tensioning means, the control means including a pressure sensor operatively coupled to the hydraulic drive circuit and being adapted to detect which of the forward and reverse drive circuit is activated, the tensioning means being adapted to apply a first force to the carriage in response to activation of the forward drive circuit, and further to apply a second and greater force to the carriage in response to activation of the reverse drive circuit, thereby adjusting the tension in the drive belt in response to which of the forward drive circuit and the reverse drive circuit has been activated.

16. An idler device for dynamically adjusting the tension on a flexible drive belt of a tracked vehicle, the tracked vehicle having a hydraulic drive system including a forward drive circuit and a reverse drive circuit, the flexible drive belt extending between a drive wheel and a carriage mounted free wheel, the idler device comprising:

a drive wheel mounted to a frame;

a carriage shiftably mounted to the frame and supporting a free wheel;

a hydraulic cylinder mounted to the frame and engaging the carriage for applying a force to the carriage; and a hydraulic control circuit operatively connected to the hydraulic cylinder, the control circuit including a sensor operatively connected to each of the forward and reverse drive circuits, the hydraulic control circuit being adapted to adjust the pressure in the hydraulic cylinder to thereby apply a first force against the carriage in response to a first detected pressure condition in the forward drive circuit, the hydraulic control circuit further being adapted to adjust the pressure in the hydraulic cylinder to thereby apply a second and greater force against the carriage in response to a second detected pressure condition in the reverse drive circuit.

17. A device for dynamically adjusting the tension on the drive belt of a tracked vehicle, comprising:

a drive wheel mounted to a frame;

a hydraulic drive system for driving the drive wheel, the hydraulic drive system including a forward drive circuit and a reverse drive circuit, the hydraulic drive means including a pump for selectively pressurizing either of the forward and reverse drive circuits;

a carriage slidably mounted to the frame and supporting a free wheel;

adjustable tensioning means mounted to the frame and engaging the carriage for applying a force to the carriage, the tensioning means including control means for controlling the tensioning means, the control means being responsive to pressure changes in either of the forward or reverse drive circuits, the tensioning means being adapted to apply a first force to the carriage in response to pressurization of the forward drive circuit and further being adapted to apply a second and greater force to the carriage in response to pressurization of the reverse drive circuit;

whereby the tension in the drive belt may be maintained at a desired level.

18. An idler device for adjusting the tension on a flexible drive belt of a tracked vehicle, the tracked vehicle having a hydraulic brake system and a hydraulic drive system including a forward drive circuit and a reverse drive circuit, the flexible drive belt extending between a drive wheel and a carriage mounted free wheel, the idler device comprising:

a drive wheel mounted to a frame;

a carriage shiftably mounted to the frame and supporting a free wheel;

a hydraulic cylinder mounted to the frame and engaging the carriage for applying a force to the carriage; and a hydraulic control circuit operatively connected to each of the hydraulic cylinder, the forward drive circuit, the reverse drive circuit, and the hydraulic brake system, the control circuit being automatically responsive to pressure changes in each of the forward drive circuit, the reverse drive circuit, and the hydraulic brake system, the control circuit and the hydraulic cylinder cooperating to apply a desired force to the carriage in response to pressure changes in each of the forward drive circuit, the reverse drive circuit, and the hydraulic brake system.

19. An idler device for adjusting the tension on a flexible drive belt of a tracked vehicle, the tracked vehicle having a hydraulic brake circuit and a hydraulic drive system including a forward drive circuit and a reverse drive circuit, the flexible drive belt extending between a drive wheel and a carriage mounted free wheel, the idler device comprising:

a drive wheel mounted to a frame;

a carriage shiftably mounted to the frame and supporting a free wheel;

a hydraulic cylinder mounted to the frame and engaging the carriage for applying a force to the carriage, thereby applying a tensioning force to the drive belt;

a hydraulic control circuit operatively connected to each of the hydraulic cylinder, the forward drive circuit, and the reverse drive circuit; and a hydraulic sensor circuit operatively connected to the hydraulic control circuit and being arranged to detect a pressure condition in each of the forward drive circuit, the reverse drive circuit, and the hydraulic brake circuit, the hydraulic sensor circuit being automatically responsive to pressure changes in each of the forward drive circuit, the reverse drive circuit, and the hydraulic brake circuit such that, upon detection of a pressure condition, the control circuit and the hydraulic cylinder cooperate to apply a desired force to the carriage.

20. An idler device for adjusting the tension on a flexible drive belt of a tracked vehicle, the tracked vehicle having a hydraulic brake system and a hydraulic drive system including a forward drive circuit and a reverse drive circuit, the flexible drive belt extending between a drive wheel and a carriage mounted free wheel, the idler device comprising:

a drive wheel mounted to a frame;

a carriage shiftably mounted to the frame and supporting a free wheel;

a two-sided hydraulic cylinder mounted to the frame and engaging the carriage for applying a force to the carriage; and a hydraulic control circuit operatively connected to both sides of the hydraulic cylinder, the hydraulic control circuit further being operatively connected to the forward drive circuit, the reverse drive circuit, and the hydraulic brake system, the hydraulic control circuit including a pressure sensor adapted to detect a pressure condition in any one of the forward drive circuit, the reverse drive circuit, and the hydraulic brake system, the hydraulic control circuit further being arranged to apply a constant pressure to a first side of the hydraulic cylinder, and further being arranged to apply a variable pressure to a second side of the hydraulic cylinder in response to a predetermined pressure condition in any one of the forward drive circuit, the reverse drive circuit, and the hydraulic brake system.

* * * * *

UNITED STATES PATENT AND TRADEMARK OFFICE
CERTIFICATE OF CORRECTION

PATENT NO.      : 6,224,172 B1
DATED           : May 1, 2001
INVENTOR(S)     : John Goodwin It is certified that error appears in the above-identified patent and that said Letters Patent is hereby corrected as shown below:

Title page,
Item [73], Assignee, should read -- Cedarapids, Inc. -- instead of "Cedarapids".
Item [75], Inventor, delete "Cedarapids" and insert -- Cedar Rapids --.

Column 6,
Line 51, insert -- of -- after "detection".
Line 52, delete "file" after "wherein".
Line 55, delete "+he" and insert -- the --.
Line 67, delete "in" and insert -- is --.

Signed and Sealed this

Seventeenth Day of December, 2002

JAMES E. ROGAN
*Director of the United States Patent and Trademark Office*